United States Patent [19]

Rakowski

[11] Patent Number: 5,033,762
[45] Date of Patent: Jul. 23, 1991

[54] SUSPENSION SYSTEM FOR A SIDECAR MOTORCYCLE

[76] Inventor: Carl F. Rakowski, 20499 Barton Rd., Pickney, Mich. 48169

[21] Appl. No.: 484,251

[22] Filed: Feb. 26, 1990

[51] Int. Cl.$^5$ .............................................. B62K 27/00
[52] U.S. Cl. ........................... 280/203; 280/DIG. 1; 280/772
[58] Field of Search ........ 280/203, 707, 772, DIG. 1, 280/840, 6.1, 6.12

[56] References Cited

U.S. PATENT DOCUMENTS

| | | | |
|---|---|---|---|
| 4,078,815 | 3/1978 | Vetter | 280/203 |
| 4,415,056 | 11/1983 | Smith | 280/203 X |
| 4,597,584 | 7/1986 | Hanser | 280/6.1 |
| 4,826,205 | 5/1989 | Kouda et al. | 280/703 |
| 4,830,394 | 5/1989 | Tanaka et al. | 280/689 |
| 4,838,563 | 6/1989 | Konishi et al. | 280/840 |

*Primary Examiner*—Charles A. Marmor
*Assistant Examiner*—Alan M. Kagen
*Attorney, Agent, or Firm*—Krass & Young

[57] ABSTRACT

A suspension system for a sidecar-type motorcycle which operates to maintain the motorcycle in a level, vertical disposition irrespective of uneven terrain being traversed by the motorcycle. The sidecar wheel is mounted on a beam which is pivotally mounted at one end on the sidecar frame. The lower end of a shock absorber is pivotally connected to the other end of the beam and the upper end of the shock absorber is connected to a lever which is pivotally mounted on the sidecar frame and which is operated by an extensible motor. The extensible motor may comprise a screw jack, an air cylinder, or a hydraulic cylinder. The extensible motor is operated either automatically by a level sensing device carried by the motorcycle or manually by the operator. In either case, extension or retraction of the extensible motor operates to raise and lower the side car wheel relative to the sidecar frame so as to maintain the sidecar frame in a level disposition irrespective of unevenness in the terrain over which the motorcycle is being operated.

24 Claims, 2 Drawing Sheets

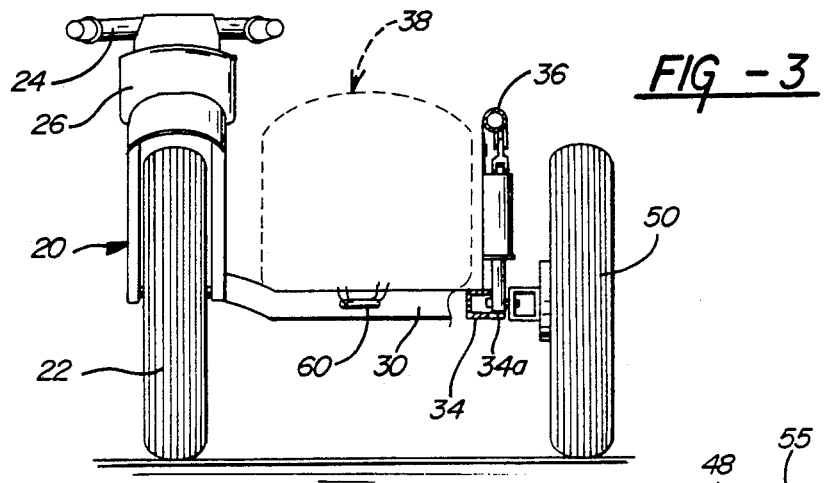
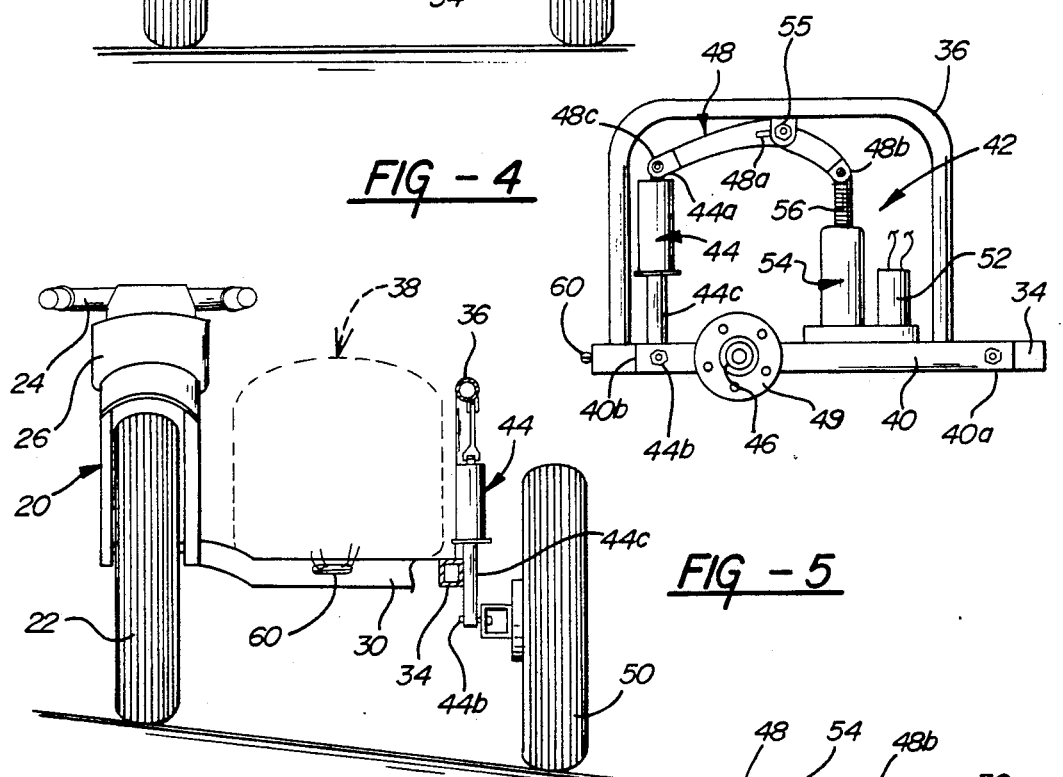
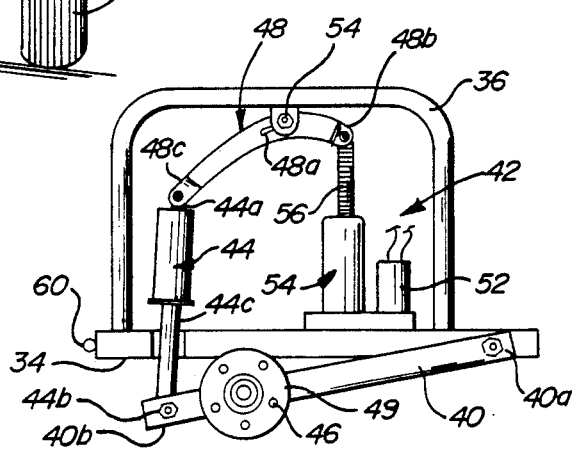

SUSPENSION SYSTEM FOR A SIDECAR MOTORCYCLE

This invention relates to a suspension system for a motorcycle and more particularly to a suspension system for a motorcycle of the type including a sidecar.

Motorcycles of the type including a sidecar are popular since they allow one or more persons to ride in comfort on the seat provided on the main frame of the motorcycle and further allow one or more additional persons to ride in comfort alongside of the vehicle operator. However, the sidecar construction has the inherent disadvantage that, when the motorcycle encounters uneven terrain, the sidecar wheel dips or rises to accommodate the uneven terrain, thereby placing the motorcycle in a tilted disposition with resultant discomfort to the motorcycle operator and passengers and with resultant difficulty in safely operating the motorcycle. Attempts have been made in the past to overcome this problem by systems that, in one instance, act to effectively tilt the sidecar wheel of the motorcycle and, in another instance, act to tilt the motorcycle itself with a lever connected to the sidecar frame. These attempts to overcome the tendency of the sidecar to place the motorcycle in a tilted disposition have not met with any significant commercial success, however, since they have been unduly complicated and/or have been ineffective in maintaining the motorcycle in an upright disposition.

SUMMARY OF THE INVENTION

This invention is directed to the provision of an improved motorcycle of the sidecar type.

More specifically, this invention is directed to the provision of a leveling system for a sidecar-type motorcycle which is effective to maintain the motorcycle in an upright disposition irrespective of the unevenness of the terrain over which the motorcycle is being operated.

According to the invention, means are provided mounting the sidecar wheel for vertical movement relative to the sidecar frame and leveling means are provided which are operative to vary the height of the sidecar wheel relative to the sidecar frame. In this arrangement, the height of the sidecar wheel relative to the sidecar frame may be selectively varied to accommodate varying terrain so that the sidecar frame, and thereby the motorcycle itself, may be maintained in an upright or level disposition relative to the horizontal respective of the unevenness of the terrain.

According to a further feature of the invention, means are provided to sense the attitude of the sidecar frame relative to the horizontal and the leveling means are operative in response to the sensing means to vary the height of the sidecar wheel relative to the sidecar frame in a sense and to an extent to maintain the sidecar frame level. This specific arrangement acts quickly and effectively to raise and lower the sidecar wheel relative to the sidecar frame so as to maintain the sidecar frame in a level disposition irrespective of uneven terrain.

According to a further feature of the invention, the mounting means comprises a wheel support member movably mounted on the sidecar frame; the sidecar wheel is mounted on the wheel support member; and the leveling means includes means varying the attitude of the wheel support member relative to the sidecar frame. This arrangement provides a ready and effective means of selectively and positively positioning the sidecar wheel relative to the sidecar frame.

According to a further feature of the invention, the wheel support member comprises a beam pivotally mounted on the sidecar frame and the leveling means is operative to vary the pivotal disposition of the beam relative to the sidecar frame. The pivotally mounted beam provides an effective way to quickly and accurately vary the attitude of the sidecar wheel relative to the sidecar frame.

According to a further feature of the invention, the leveling means includes an extensible motor mounted on the sidecar frame and linkage means operative in response to extension of the motor to vary the pivotal disposition of the beam relative to the sidecar frame. This arrangement allows the utilization of readily available extensible motor equipment to provide the desired height adjustment of the sidecar wheel relative to the sidecar frame.

According to a further feature of the invention, the linkage means includes a shock absorber connected at one end to the beam and a lever pivotally mounted on the sidecar frame and connected at its respective ends to the extensible motor and to the other end of the shock absorber. This arrangement provides a shock absorber for the wheel for normal cushioning or damping operation while further utilizing the shock absorber to form a part of the linkage interconnecting the extensible motor to the beam mounting the sidecar wheel.

In the disclosed embodiment of the invention, one end of the beam is pivotally mounted on the sidecar frame, the shock absorber is connected to the other end of the beam, and the sidecar wheel is mounted on the beam at a location intermediate the ends of the beam. This specific arrangement maximizes the mechanical efficiency of the system and, specifically, provides a damping system for the sidecar wheel during normal operation while further providing an effective height adjustment mechanism to maintain the sidecar frame level during operation over uneven terrain.

The extensible motor may comprise a screw jack, a hydraulic cylinder, or an air cylinder, and the extensible motor may be operated either manually by the motorcycle operator or automatically in response to a signal generated by a device to sense the attitude of the motorcycle.

BRIEF DESCRIPTION OF THE DRAWING

FIG. 3 is a rear view showing the motorcycle operating on level terrain;

FIG. 4 is a side elevational view corresponding to the motorcycle disposition of FIG. 3;

FIG. 5 is a rear view showing the motorcycle operating over uneven terrain;

FIG. 6 is a side elevational view corresponding to the motorcycle disposition of FIG. 5;

DETAIL DESCRIPTION OF THE PREFERRED EMBODIMENT

Figure 1:
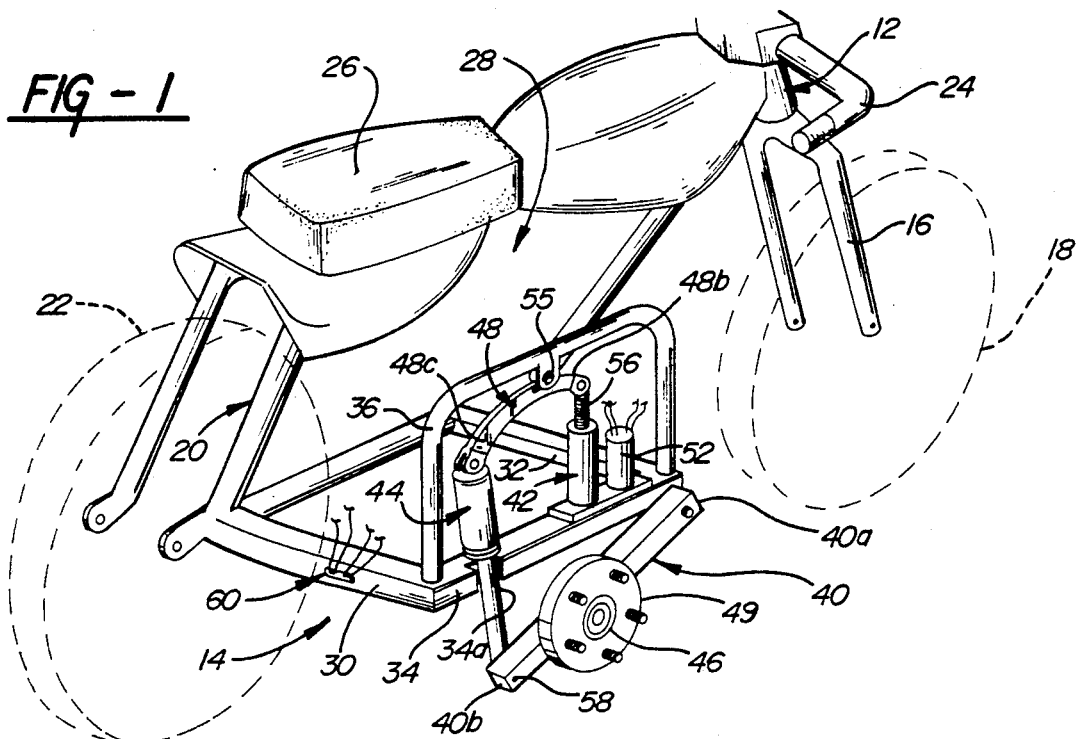
FIG. 1 is a perspective and somewhat diagrammatic view of a sidecar-type motorcycle employing the suspension system of the invention.

The motorcycle 10 seen schematically in FIG. 1 includes a main frame 12 and a sidecar frame 14 extending laterally and rigidly from the main frame.

The main frame 12 is of known form and includes a front fork 16 supporting a front wheel 18 and a rear fork 20 supporting a rear wheel 22. A handlebar 24 is provided in association with front fork 16, a seat 26 is supported on main frame 12 for supporting the motorcycle operator, and an engine 28 is provided to propel the motorcycle in known manner.

Sidecar frame 14 is shown schematically and includes laterally extending frame members 30 and 32 and an outboard longitudinally extending frame member 34. A further U-shaped frame member 36 is rigidly secured at its opposite lower ends to the front and rear ends of frame member 34. A side car body 38, shown in phantom, is suitably supported in known manner on the sidecar frame so as to accommodate a passenger.

The invention suspension system includes a beam 40, an extensible motor assembly 42, a shock absorber 44, and a lever 48. Beam 40 is pivotally mounted at its front end 40a to the front end of side frame member 34 and carries an axle 46 intermediate its ends which in turn journals a mounting flange 49 to facilitate the mounting of the sidecar wheel 50.

Extensible motor assembly 42 comprises a motorized screw jack including an electric motor 52 driving a screw jack 54. Screw jack assembly 42 is suitably mounted on frame member 34 and may, for example, comprise an assembly available from Warner Electric as Part No. DCA 2PC-04-12V4791.

Lever 48 has an arcuate configuration and is pivotally mounted intermediate its ends on a pin 55 carried by frame member 36. Pin 55 is received in an arcuate slot 48a in the lever and the front end 48b of lever 48 is pivotally connected to the upper end of the screw 56 of screw jack 54.

Shock absorber 44 is pivotally mounted at its upper end 44a to the rearward end 48c of lever 48 and is pivotally mounted at its lower end at 44ba to the rearward end 40b of beam 40 with the piston rod 44c of the shock absorber passing through a clearance slot or notch 34a provided in frame member 34. Shock absorber 44 is of the spring loaded, adjustable type and may, for example, comprise a unit available from Showa Inc. of Japan as Part No. 4413.

It will be seen that extension and retraction of screw jack 54 in response to energization of motor 52 has the effect, via lever 48 and shock absorber 44, of pivoting beam 40 about its rear end 40a and thereby lowering and raising the sidecar wheel 50 mounted on the mounting flange 48. Thus, as best seen by a comparison of FIGS. 3-4 and FIGS. 5-6, the sidecar frame may be maintained in a level disposition, and the motorcycle main frame in a vertical disposition, irrespective of uneven terrain over which the motorcycle is operated.

Specifically, as seen in FIGS. 3 and 4, the sidecar wheel 50 is maintained in generally coaxial relation to the front and rear wheels 18 and 22 of the motorcycle during operation over level terrain but, as seen in FIGS. 5 and 6, is dropped to a position below the primary wheels 18 and 22 in a situation where the terrain beneath the sidecar wheel is depressed. It will be understood that, in a similar manner, the sidecar wheel 50 is raised relative to the sidecar frame to maintain the sidecar frame in a level disposition when the sidecar wheel is moving over terrain that is higher than the terrain being traversed by the primary wheels of the motorcycle.

The invention suspension system further includes a control system to control the operation of the motor 52. The control system may be automatic in response to a device for sensing the attitude of the sidecar frame or may be manual. Automatic operation is illustrated in FIGS. 1–6 and manual operation is illustrated in FIG. 8.

In the automatic operation or FIGS. 1–6, a mercury switch 60 is provided on sidecar frame member 30 and operates in known manner to sense the attitude of the sidecar frame. Specifically, when the sidecar frame tends to dip downwardly relative to the horizontal, mercury in the switch 60 establishes communication between wires 62 and 64 to transmit a signal to motor 52 to actuate the screw jack 54 in a sense to extend the screw jack and move the sidecar wheel 50 downwardly relative to the sidecar frame until the mercury switch, and thereby the sidecar frame, is again placed in a horizontal disposition, thereby breaking communication between wire 62 and 64 and terminating energization of the motor 52 and thereby extension of the screw jack 54. Conversely, if the sidecar frame begins to move upwardly relative to the horizontal, the mercury switch operates to establish communication between leads 66 and 68 and these leads send a signal to motor 52 in a sense to contract the extensible screw jack 54 and thereby raise the sidecar wheel relative to the sidecar frame to return the sidecar frame to a level disposition with the extent of upward movement of the wheel again being delimited by the return of the mercury switch, and thereby the sidecar frame, to a level disposition in which communication is broken between leads 66 and 68.

Figure 8:
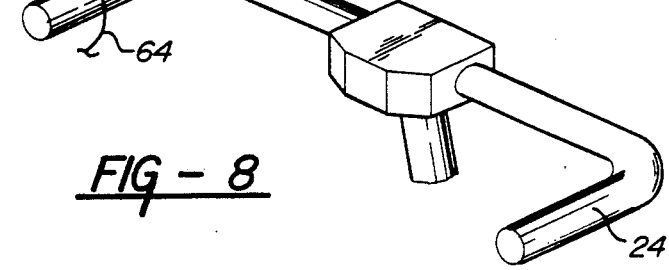
FIG. 8 illustrates a manual control system suitable for use with the invention suspension system.

Alternatively, as seen in FIG. 8, the mercury switch may be dispensed with and a manual switch 70 may be provided on the handlebar 24 of the motorcycle for operation by the motorcycle operator. Switch 70 may take various forms and may, for example, and as illustrated, include a switch member 72 movable in a forward direction to effect raising of the sidecar wheel via leads 66 and 68 and movable in a rearward direction to effect lowering of the sidecar wheel via leads 62 and 64.

Figure 7:
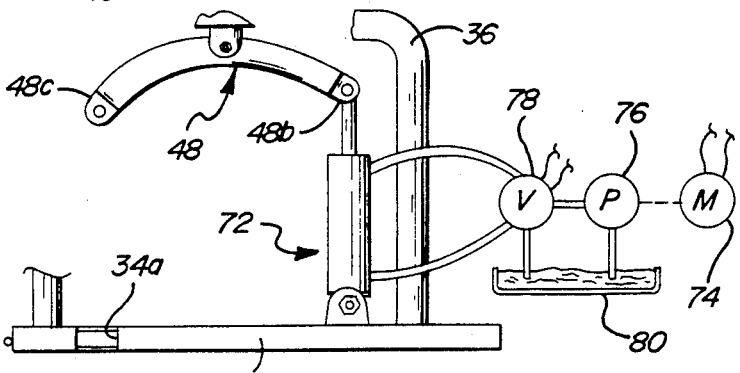
FIG. 7 illustrates an alternate form of extensible motor for use in the invention suspension system.
Figure 2:
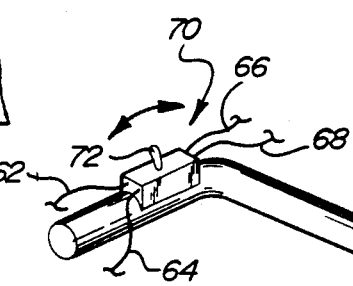
FIG. 2 is a detail view showing a sensing means utilized in the invention suspension system.

Other forms of extensible motors may also be employed as alternatives to the screw jack assembly 42. Specifically, as seen in FIG. 7, a cylinder or jack 72 may be utilized in place of a screw jack. Cylinder 72 may comprise a hydraulic cylinder or an air cylinder and, in either event, is supplied with pressurized fluid via an onboard pressurized air or pressurized hydraulic fluid supply including an electric motor 74 driving a pump 76 coacting with a valve 78. Motor 74 may be energized either by mercury switch 60 or by the manual switch 70 with the signal provided either by the mercury switch 60 or by the manual switch 70 operating to energize the motor as well as operate a solenoid associated with valve 78 to place the valve either in a disposition to deliver a pressurized fluid to the cylinder in a sense to contract the cylinder or to deliver pressurized fluid to the cylinder in a sense to extend the cylinder. In the case of a hydraulic system, pump 76 and valve 78 communicate in known manner with a reservoir 80. Cylinder 72 may, for example, comprise a unit available from Flair Line Inc. of San Leandro, Calif., as Part No. H 1⅛×5.

The invention suspension system will be seen to provide a simple and effective means of maintaining a sidecar motorcycle in a level, vertical disposition irrespective of unevenness in the terrain over which the motorcycle is being operated.

Whereas preferred embodiments of the invention have been illustrated and described in detail it will be apparent that various changes may be made in the disclosed embodiment without departing from the scope or spirit of the invention.

I claim:

1. A leveling suspension system for use with a motorcycle of the type including a main frame mounting front and rear wheels of the motorcycle and defining a seat for supporting a motorcycle operator, a sidecar frame extending laterally from the main frame to support a sidecar of the motorcycle, and a sidecar wheel carried by the sidecar frame at a position outboard of the sidecar, said suspension system comprising:
   means mounting the sidecar wheel for vertical movement relative to a portion of the sidecar frame rigid with the main frame;
   motor means mounted on the rigid sidecar frame portion operative when actuated to vary the vertical position of the sidecar wheel relative to the rigid portion of the sidecar frame; and
   control means operative to actuate said motor means.

2. A suspension system according to claim 1 wherein:
   said suspension system further includes sensing means operative to sense an attitude of the sidecar frame relative to horizontal; and
   said motor means is operative in response to said sensing means to vary the vertical position of the sidecar wheel relative to the rigid portion of the sidecar frame in a sense and to an extent to maintain the sidecar frame level.

3. A suspension system according to claim 1 wherein:
   said mounting means comprises a wheel support member movably mounted on the sidecar frame;
   the sidecar wheel is mounted on said wheel support member; and
   said motor means includes means varying an attitude of said wheel support member relative to the sidecar frame.

4. A suspension system according to claim 3 wherein:
   said wheel support member comprises a beam pivotally mounted to the sidecar frame; and
   said motor means is operative to vary the pivotal disposition of said beam relative to the sidecar frame.

5. A leveling suspension system for use with a motorcycle of the type including a main frame mounting front and rear wheels of the motorcycle and defining a seat for supporting a motorcycle operator, a sidecar frame extending laterally from the main frame to support a sidecar of the motorcycle, and a sidecar wheel carried by the sidecar frame at a position outboard of the sidecar, said suspension system comprising:
   a beam pivotally mounted to the sidecar frame and mounting said sidecar wheel;
   an extensible motor mounted on the sidecar frame; and
   linkage means operative in response to extension of said motor to vary the pivotal disposition of said beam relative to the sidecar frame and thereby vary the vertical position of the sidecar wheel relative to the sidecar frame.

6. A suspension system according to claim 5 wherein: said linkage system includes a shock absorber connected at one end to said beam and a lever pivotally mounted on the sidecar frame and connected at its respective ends to said extensible motor and to the other end of said shock absorber.

7. A suspension system according to claim 6 wherein:
   said beam is mounted at its one end on the sidecar frame, said shock absorber is connected to the other end of said beam, and the sidecar wheel is mounted on said beam at a location intermediate the ends of the beam.

8. A suspension system according to claim 5 wherein:
   said extensible motor comprises a screw jack.

9. A suspension system according to claim 5 wherein:
   said extensible motor comprises a hydraulic cylinder.

10. A suspension system according to claim 5 wherein:
    said extensible motor comprises an air cylinder.

11. A motorcycle assembly comprising a main frame mounting front and rear wheels of the motorcycle and defining a seat for a motorcycle operator;
    a sidecar frame extending laterally from said main frame;
    means mounting a sidecar wheel on said sidecar frame for vertical movement relative to a portion of the sidecar frame rigid with the main frame;
    motor means mounted on the rigid sidecar frame portion operative when actuated to vary the vertical position of the sidecar wheel relative to the rigid portion of said sidecar frame; and
    control means operative to actuate said motor means.

12. An assembly according to claim 11 wherein:
    said assembly further includes means operative to sense an attitude of the sidecar frame relative to horizontal; and
    said motor means is operative in response to said sensing means to vary the vertical position of the sidecar wheel relative to said side car frame in a sense and to an extent to maintain said sidecar frame level.

13. An assembly according to claim 11 wherein:
    said mounting means comprises a wheel support member movably mounted on said sidecar frame;
    the sidecar wheel is mounted on said wheel support member; and
    said motor means includes means varying an attitude of said wheel support member relative to said sidecar frame.

14. An assembly according to claim 13 wherein:
    said wheel support member comprises a beam pivotally mounted on said sidecar frame; and
    said motor means is operative to vary the pivotal disposition of said beam relative to said sidecar frame.

15. A motorcycle assembly comprising a main frame mounting front and rear wheels of the motorcycle and defining a seat for a motorcycle operator;
    a sidecar frame extending laterally from said main frame;
    a beam pivotally mounted on said sidecar frame;
    a sidecar wheel mounted on said beam;
    an extensible motor mounted on said sidecar frame; and
    linkage means operative in response to extension of said motor to vary the pivotal disposition of said beam relative to said sidecar frame and thereby vary the vertical position of said sidecar wheel relative to said sidecar frame.

16. An assembly according to claim 15 wherein:

said linkage means includes a shock absorber connected at one end to said beam and a lever pivotally mounted on said sidecar frame and connected at its respective ends to said extensible motor and to the other end of said shock absorber.

17. An assembly according to claim 16 wherein:
said beam is mounted at its one end on said sidecar frame, said shock absorber is connected to the other end of said beam, and the sidecar wheel is mounted on said beam at a location intermediate the ends of said beam.

18. An assembly according to claim 15 wherein:
said extensible motor comprises a screw jack.

19. An assembly according to claim 15 wherein:
said extensible motor comprises a hydraulic cylinder.

20. An assembly according to claim 15 wherein:
said extensible motor comprises an air cylinder.

21. A leveling suspension system for use with a motorcycle of the type including a main frame mounting front and rear wheels of the motorcycle and defining a seat for supporting a motorcycle operator, a sidecar frame extending laterally from the main frame to support a sidecar for the motorcycle, and a sidecar wheel carried by the sidecar frame at a position outboard of the sidecar, said suspension system comprising:
a shock absorber interconnected between the sidecar frame and the sidecar wheel;
motor means mounted on the rigid sidecar frame portion operative when actuated to move said shock absorber in its entirety relative to the sidecar frame; and control means operative to actuate said motor means.

22. A suspension system according to claim 21 wherein:
said suspension system includes a beam pivotally mounted to the sidecar frame and carrying the sidecar wheel; and
said shock absorber is pivotally mounted at one end to said beam.

23. A leveling suspension system for use with a motorcycle of the type including a main frame mounting front and rear wheels of the motorcycle and defining a seat for supporting a motorcycle operator, a sidecar frame extending laterally from the main frame to support a sidecar for the motorcycle, and a sidecar wheel carried by the sidecar frame at a position outboard of the sidecar, said suspension system comprising:
a beam pivotally mounted to the sidecar frame and carrying the sidecar wheel;
a shock absorber pivotally mounted at one end thereof to said beam;
an extensible motor mounted on the sidecar frame; and
linkage means connecting said extensible motor to the other end of said shock absorber.

24. A suspension system according to claim 23 wherein:
said linkage means includes a lever pivotally mounted intermediate its ends on the sidecar frame and pivotally connected at its respective ends to the other end of said shock absorber and to said extensible motor.

* * * * *